(12) United States Patent
Chung et al.

(10) Patent No.: US 7,562,559 B2
(45) Date of Patent: Jul. 21, 2009

(54) FUEL VAPOR DETECTION SYSTEM FOR VEHICLES

(75) Inventors: Jae Chung, Novi, MI (US); Marsha Wendel, New Boston, MI (US); David Waskiewicz, Hamburg, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

(21) Appl. No.: 11/396,462

(22) Filed: Apr. 3, 2006

(65) Prior Publication Data

US 2006/0174698 A1    Aug. 10, 2006

Related U.S. Application Data

(63) Continuation of application No. 10/943,532, filed on Sep. 16, 2004, now abandoned.

(51) Int. Cl.
G01M 3/04 (2006.01)
(52) U.S. Cl. .................................................. 73/49.7
(58) Field of Classification Search ............ 73/49.7, 73/114.01; 123/560
See application file for complete search history.

(56) References Cited

U.S. PATENT DOCUMENTS

| | | | | |
|---|---|---|---|---|
| 4,932,386 A | * | 6/1990 | Uozumi et al. | 123/520 |
| 5,329,164 A | * | 7/1994 | Saito | 307/10.1 |
| 5,474,047 A | * | 12/1995 | Cochard et al. | 123/491 |
| 5,884,610 A | * | 3/1999 | Reddy | 123/520 |
| 6,223,732 B1 | * | 5/2001 | Isobe et al. | 123/520 |
| 6,286,316 B1 | * | 9/2001 | Waldrop et al. | 60/660 |
| 6,363,919 B1 | * | 4/2002 | Isobe et al. | 123/520 |
| 6,367,459 B1 | * | 4/2002 | Yoshioka et al. | 123/520 |
| 6,425,365 B1 | * | 7/2002 | Peters et al. | 123/198 DB |
| 6,474,303 B1 | * | 11/2002 | Leone et al. | 123/432 |
| 6,695,895 B2 | * | 2/2004 | Hyodo et al. | 96/111 |
| 6,758,185 B2 | * | 7/2004 | Surnilla et al. | 123/198 F |
| 6,786,207 B2 | * | 9/2004 | Kojima et al. | 123/516 |
| 7,000,602 B2 | * | 2/2006 | Cullen et al. | 123/698 |
| 7,069,915 B2 | * | 7/2006 | Brandenburg et al. | 123/516 |
| 7,073,494 B2 | * | 7/2006 | Cullen et al. | 123/698 |
| 7,216,635 B1 | * | 5/2007 | Roche et al. | 123/516 |

\* cited by examiner

*Primary Examiner*—Hezron Williams
*Assistant Examiner*—Rodney T Frank
(74) *Attorney, Agent, or Firm*—David Kelley, Esq.; Tung & Associates

(57) ABSTRACT

An electric motor or generator is used to spin the vehicle's internal combustion engine while the engine is not running, in order to draw a vacuum within the vapor control system. Vacuum bleed off is then monitored to determine if an unacceptable condition in the control system may exist. The evaporative fuel emissions test may be conducted either while the vehicle is at rest or while under way in an electric drive mode of operation.

26 Claims, 2 Drawing Sheets

FUEL VAPOR DETECTION SYSTEM FOR VEHICLES

This is a continuation of application No. 10/943,532, filed Sep. 16, 2004 now abandoned.

FIELD OF THE INVENTION

This invention generally relates to emission control systems for vehicles, and deals more particularly with a method of detecting evaporative fuel emissions for a vehicle.

BACKGROUND OF THE INVENTION

Evaporative emission control systems are well known in internal combustion engine powered motor vehicles to prevent evaporative fuel, i.e., fuel vapor, from being emitted from the fuel tank into the atmosphere. These control systems typically include several primary components that control evaporative emission operations: vapor control valves, vapor management valves and a carbon canister for absorbing the vapors.

From time to time, fuel vapors may be vented improperly, resulting in reduced engine performance and the possibility of vapor emissions into the atmosphere. A variety of on-board diagnostic systems have been devised for detecting such emissions in the evaporative emission control system so that appropriate corrective measures may be taken.

Conventional emissions control may include: (1) an intake manifold of an engine connecting to a vapor control system in order to draw a vacuum on the control system, (2) sealing the vapor control system and/or, (3) bleeding-off and monitoring the resulting vacuum in the control system. With vehicles powered only by an internal combustion engine, these steps can only be performed while the engine is running. Coordinating the requirements of the engine control system and the evaporative emission control system test procedure places constraints on both systems. These problems are exacerbated in hybrid powered vehicles using both an internal combustion engine and an electric drive motor. Hybrid powered vehicles, when operating in an internal combustion (IC) mode, tend to run at relatively wide-open throttle for substantial periods in order to maximize operating efficiency. At open or near wide-open throttle, however, intake manifold pressure is lower, limiting the engine's ability to draw a vacuum in the evaporative emission control system to facilitate emissions detection.

Accordingly, a need exists in the art for a method of emissions detection that can be performed effectively while the engine is not running. The present invention is intended to satisfy that need.

SUMMARY OF THE INVENTION

A method is provided for detecting fuel vapor emissions from an internal combustion engine driven vehicle while the engine is not running. A detection test can be performed while the vehicle is not operating, or while the vehicle is powered by an alternative drive source such as an electric motor in combination with a battery fuel cell or other electric power source. In accordance with one embodiment of the present method, the method advantageously uses an onboard electric machine operated in a motor mode, to spin the non-running IC engine in order to draw a vacuum on the vapor emission control system, which is then monitored to diagnose proper operation of the vehicle emissions control system.

In accordance with a first embodiment of the invention, a method is provided of detecting a fuel vapor emissions of an internal combustion, while the engine is not running. The method includes closing a first valve used for controlling the escape of fuel vapor emissions from the system, closing a throttle to prevent air from entering the engine through the throttle, opening a fuel vapor management valve to connect the engine with the control system, rotating the engine to reduce the fuel vapor pressure in the control system, then closing the vapor management valve and measuring the vapor pressure in the control system, a change in the system pressure indicating a possible unacceptable condition in the control system. The throttle is closed by moving a throttle plate to a closed position blocking airflow into the intake manifold of the engine. Rotation of the engine is performed using either an electric drive motor or an onboard generator operated as a drive motor. The detection method may be used in hybrid powered vehicles in which the electric drive motor or generator is employed as the power source to spin the IC engine during the evaporative fuel emissions test.

In accordance with a second embodiment of the invention, a method is provided for detecting a evaporative fuel emissions in a fuel vapor emission control system of a hybrid powered vehicle having an internal combustion engine and an electric drive motor. The method comprises the steps of determining if the IC engine is running, closing the emission control system when the IC engine is determined not to be running, opening a fuel vapor management valve connecting the engine with the emission control system, rotating the engine to reduce the fuel vapor pressure within the emission control system, closing the fuel vapor management valve and then measuring the vapor pressure in the control system to determine whether a evaporative fuel emissions may be present.

These non-limiting features, as well as other advantages of the present invention may be better understood by considering the following details of a description of a preferred embodiment of the present invention. In the course of this description, reference will frequently be made to the attached drawings.

DETAILED DESCRIPTION OF THE PREFERRED EMBODIMENT

Figure 1:
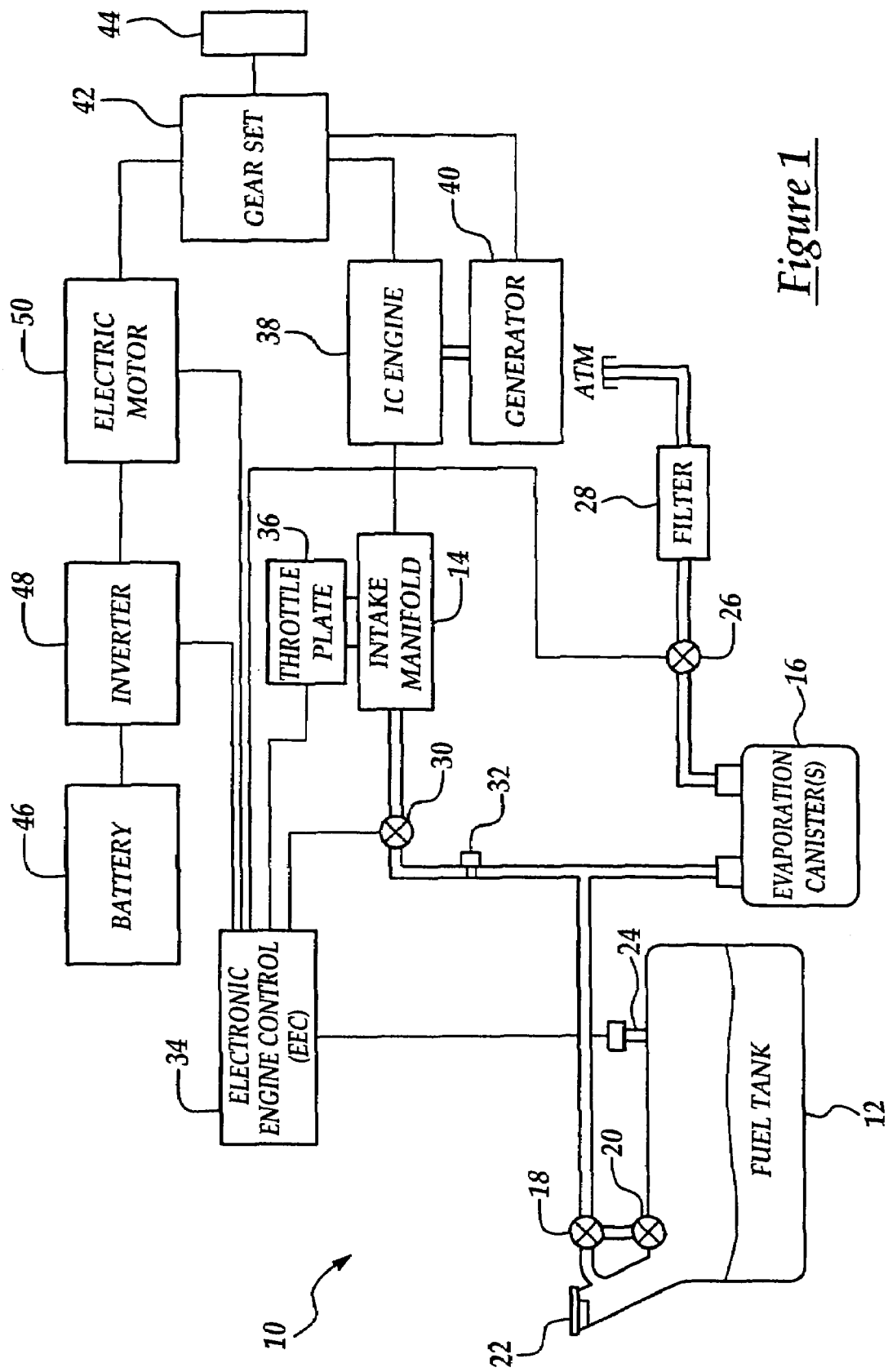
FIG. 1 is a combined block and schematic diagram of a hybrid powered vehicle provided with a fuel vapor emission control system; and, FIG. 2 is a flow diagram showing the steps of the method forming the preferred embodiment of the invention.

Referring first to FIG. 1, a vehicle is equipped with an evaporative, fuel vapor emission control system, generally indicated by the numeral 10. In the illustrated embodiment, the vehicle is of the hybrid powered type, driven by an internal combustion engine 38 and an electric motor 50 which drive one or more traction wheels 44 through a set of gears 42. The electric motor 50 is powered by energy stored in a battery 46 whose DC output is converted to AC by an inverter 48. The electric motor 50 may be operated in a regenerative mode to generate electrical power used for recharging battery 46. Additionally, an electrical generator 40 also produces electrical energy and is driven either directly by the engine 38 or through gear-set 42. Generator 40 may also be operated as an electric motor capable of spinning (cranking) the IC engine 38 through either a direct drive connection or via the gear-set 42. The above mentioned drive components are controlled by an electronic engine control (EEC) 34, which also controls the operation of the emission control system 10.

The emission control system 10 includes a fuel tank 12 having its upper internal volume in communication with one or more evaporative canisters 16 and the intake manifold 14 of engine 38. The fuel tank 12 provides fuel to the engine 38 and typically includes a vapor vent valve 18 as well as a rollover valve 20. The fuel tank 12 may also include a vacuum relief valve 22, integral with the fuel tank cap, for preventing excessive vacuum or pressure from being applied to the fuel tank 12. The fuel tank 12 further includes a pressure transducer 24 for monitoring fuel tank pressure or vacuum and for providing a corresponding input signal to the EEC 34. The pressure transducer 24 may be installed directly into the fuel tank 12 or remotely mounted and connected by a line to the fuel tank 12.

Evaporation canister 16 is provided for trapping and subsequently using fuel vapor dispelled from the fuel tank 12. The evaporation canister 16 is connected to the atmosphere through a canister vent valve (CVV) 26. A filter 28 may be provided between the CVV 26 and the atmosphere for filtering the air pulled into the evaporation canister 16. The CVV 26 may comprise a normally open solenoid controlled by the EEC 34 via an electrical connection to the CVV 26.

A vapor management valve (VMV) 30 is coupled between the intake manifold 14 and a fuel tank 12 and the evaporation canister 16. The VMV 30 may comprise a normally closed vacuum operated solenoid which is also energized by the EEC 34. When the VMV 30 opens, the vacuum of the intake manifold 14 draws fuel vapor from the evaporation canister 16 for combustion in the cylinders of the engine 38. When the EEC 34 de-energizes the VMV 30, fuel vapors are stored in the evaporation canister 16.

The system 10 may further include a service port 32 coupled between the VMV 30 and the fuel tank 12 and the evaporation canister 16. The service port 32 aids an operator in performing diagnostics on the emission control system 10 to identify malfunctions.

In addition to controlling the CVV 26 and VMV 30, the EEC 34 also controls a throttle plate 36 forming part of a throttle body (not shown) which in turn controls the flow of air into the intake manifold 14.

The EEC 34 may perform a series of routine diagnostic tests to determine whether the emission control system 10 is operating properly, at any of various times when the vehicle is running. These diagnostic tests may include gross evaporative fuel emissions detection and small evaporative fuel emissions detection. In accordance with the method of the present invention, however, a diagnostic test to determine the possibility of a evaporative fuel emissions in the control system 10 may be carried out while the engine 38 is not running, as would be the case when the vehicle was either being driven under the power of the electric motor 50 or when the vehicle is stationary and the IC engine 38 is turned off.

Figure 2:
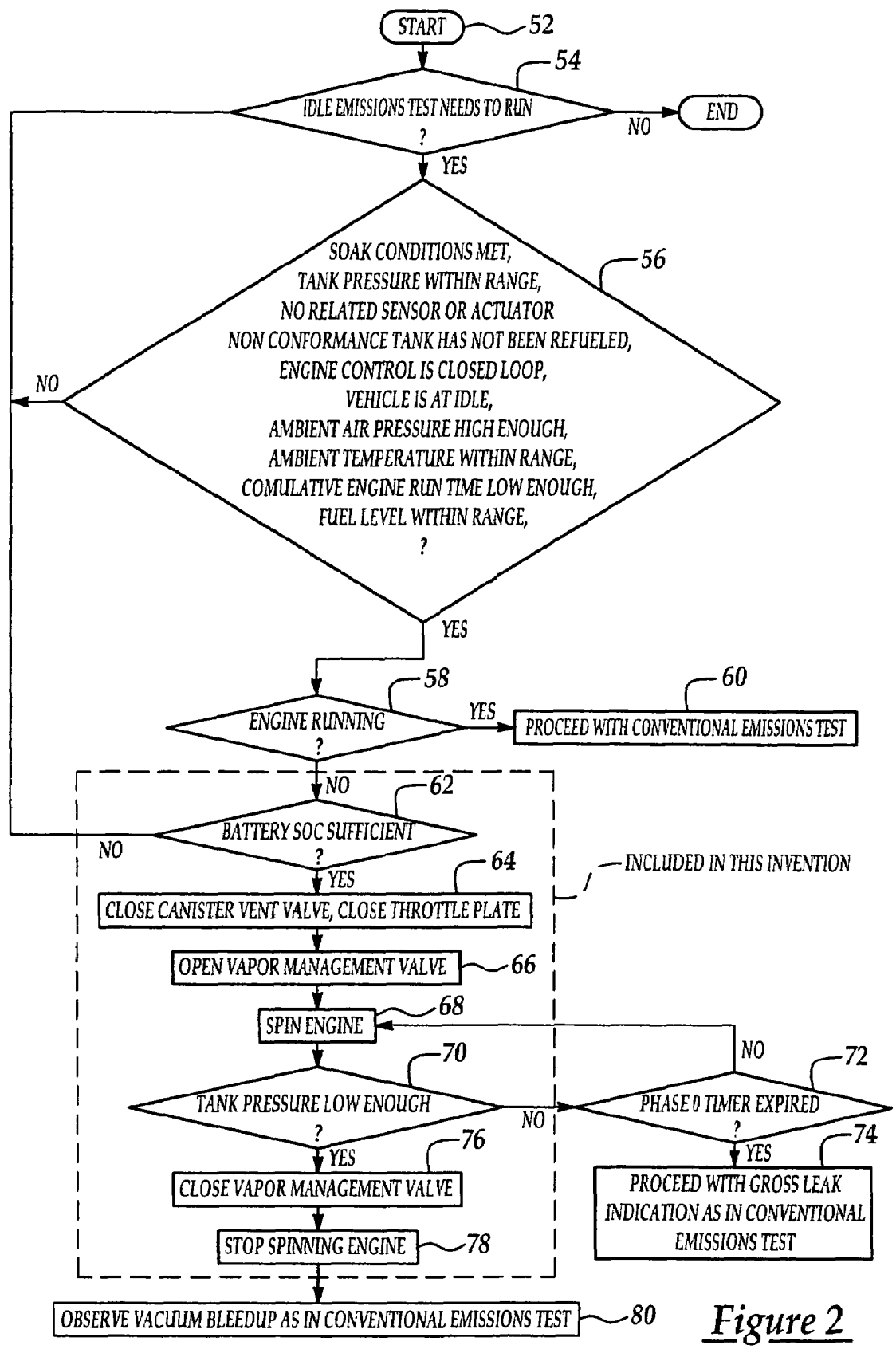

The method of the present invention may be better understood by referring now also to FIG. 2, which shows the flow chart of the steps comprising the present method. The evaporative fuel emissions detection method is started at 52 and responds to an initiating signal produced by the EEC 34 or other on-board controller which initiates periodic diagnostic tests. A determination is initially made at 54 as to whether a evaporative fuel emissions test needs to be performed based upon current vehicle operating conditions or historical data. For example, pre-programmed instructions may dictate that a evaporative fuel emissions test be performed within ten minutes following turning on of the vehicle's ignition. If it is confirmed that a evaporative fuel emissions test is to be initiated, then the existence of a series of operating conditions are confirmed at step 56. For example, before proceeding with the evaporative fuel emissions test, it must be confirmed that the pressure within the fuel tank 12 is within a prescribed range, that there have been no sensor or actuator failures, that the tank 12 has not been recently refueled, that the engine controls are in a closed loop mode and the vehicle is at idle conditions. Further it is confirmed that the ambient air pressure is sufficiently high, that ambient temperature is within a prescribed range, that the cumulative engine run-time is low enough and that the level of the fuel within tank 12 is within a certain range.

Once the conditions in step 56 have been confirmed, a determination is made at step 58 of whether the IC engine 38 is running. If the engine 38 is running, then the EEC 34 initiates a conventional evaporative fuel emissions test of the control system 10. However, if the engine is determined not to be running at step 58, then the following steps of the method of the present invention are carried out to perform evaporative fuel emissions testing.

First, at step 62 a determination is made as to whether the battery 46 has a state of charge (SOC) within a prescribed range. If the battery SOC is not within a prescribed range, the process returns to step 54. However, if the battery SOC is within the prescribed range, then the process proceeds to step 64 in which both the CVV 26 and the throttle plate 36 are moved to their closed positions. With both the CVV 26 and throttle plate 36 closed, the emission control system 10 is effectively closed from the atmosphere, since atmospheric air may not pass into the system through the CVV 26 and fresh air may not pass into the intake manifold 14.

Next, at step 66, the VMV 30 is opened, placing the engine 38 in fluid communication within the control system 10. Then, at step 68, the generator 40 is operated as a motor to spin or "crank" the engine 38, causing the engine's pistons to reciprocate which in turn forces air out of the piston cylinders into an exhaust manifold (not shown). Spinning of the engine 38 therefore reduces the vapor pressure within intake manifold 14, and thus within the lines and components comprising the emission control system 10. The EEC 34 monitors the vapor pressure within the control system 10 and when this pressure drops to a pre-selected level representing the necessary vacuum required to perform the evaporative fuel emissions detection, the EEC 34 commands the generator 40 to stop spinning the engine 38. If, however, the requisite vacuum level is not created within a pre-selected time period shown in step 72, the evaporative fuel emissions detection method is terminated, and a different protocol is followed, such as the performance of a conventional, gross evaporative fuel emissions detection at step 74.

Assuming however that spinning of the engine 38 reduces the vapor pressure in the control system 10 to the pre-selected level within the prescribed time period, then the VMV 30 is closed at 76 and spinning of the engine 38 is terminated at step 78. At this point, with the intake manifold 14 isolated from the remainder of the control system, the EEC 34 monitors the rate of vacuum bleed-off within the control system 10. The rate of vacuum bleed-off, i.e. pressure drop in the control system is indicative of a possible evaporative fuel emissions in the system. If the pressure drop exceeds a pre-selected rate then a flag is issued within the EEC 34 which records the possibility of a vapor evaporative fuel emissions requiring corrective action.

From the foregoing, it can be seen that the method of the present invention provides a very simple evaporative fuel emissions detection method which uses the IC engine 38 to produce a vacuum within the emission control system 10, then seals the control system and subsequently monitors the ability of the system to maintain this vacuum. When used in a hybrid vehicle, advantage can be taken of the electric drive motor or generator to spin the IC engine 38 to produce the vacuum while the engine is not running. Although a generator 40 has been disclosed as being the motive means for spinning the IC engine 38, the spinning could also be produced by power from the electric motor 20 which is transmitted as a torque through the gear-set 42 to the crankshaft of the IC engine 38.

It is to be understood that the specific methods and techniques which have been described are merely illustrative of one application of the principles of the invention. Numerous modifications may be made to the method and system as described without departing from the true spirit and scope of the invention.

What is claimed is:

1. A method of monitoring fuel vapor recovery system integrity in a fuel vapor recovery system having an internal combustion engine, said monitoring occurs while the engine is not running, comprising the steps of:
    closing a first valve for controlling the escape of fuel vapor from the recovery system to the atmosphere;
    closing a throttle on the engine to prevent air from entering into the engine through the throttle;
    opening a fuel vapor management valve connecting the engine with the recovery system while the engine is not running;
    rotating the engine to reduce the fuel vapor pressure in the recovery system;
    closing the vapor management valve; and
    measuring the fuel vapor pressure in the recovery system and determining a breech of said fuel vapor recovery system integrity when a change in pressure is detected.

2. A method of monitoring fuel vapor recovery system integrity in a fuel vapor recovery system having an internal combustion engine, said monitoring occurs while the engine is not running, comprising the steps of:
    opening a fuel vapor management valve providing fluid communications between the engine and the fuel vapor recovery system while the engine is not running;
    rotating the engine to reduce and to determine a first fuel vapor pressure in the fuel vapor recovery system; and
    measuring a second fuel vapor pressure in the recovery system and determining a change in pressure in said fuel vapor recovery system when compared to said first fuel vapor pressure indicative of evaporative fuel emissions.

3. The method of claim 2 further comprising the steps, prior to said opening step, of:
    closing a first valve for controlling the escape of fuel vapor from the fuel vapor recovery system to the atmosphere; and
    closing a throttle on the engine to prevent air from entering into the engine through the throttle.

4. The method of claim 2 further comprising the step, in between said rotating step and a detecting step, of:
    closing the fuel vapor management valve.

5. The method of claim 2, wherein the step of closing the throttle comprises closing a throttle plate controlling the flow of air into the engine.

6. The method of claim 1, wherein the step of rotating the engine comprises powering the engine using an electric drive motor.

7. The method of claim 1, wherein the rotating step is continued for a preselected length of time.

8. The method of claim 7, wherein the step of measuring the pressure is performed continuously during the preselected length of time.

9. The method of claim 7, further comprising the step of closing a vapor management valve after the preselected length of time.

10. The method of claim 2, wherein the rotating step is continued for a preselected length of time, and the method further comprises closing a vapor management valve when the pressure measured is below a preselected pressure.

11. The method of claim 2, wherein the rotating step comprises powering the engine with an electrical generator operated as an electric drive motor.

12. The method of claim 2, wherein the method further comprises ending rotation of the engine after the pressure has been measured for a preselected length of time.

13. The method of claim 12, wherein the method further comprises monitoring the pressure after the rotation of the engine has ended.

14. A method of monitoring fuel vapor recovery system integrity in a fuel vapor recovery system for a vehicle having an internal combustion engine, said monitoring occurs while the engine is not running, said vehicle having a fuel tank, a vent valve controlling the flow of fuel vapor to a vent, an internal combustion engine having an intake manifold and a throttle valve for controlling the flow of air into the intake manifold, and a fuel vapor management valve for controlling the flow of fuel vapor between the fuel vapor recovery system and the engine, comprising the steps of:
    opening the fuel vapor management valve to place the intake manifold in fluid communication with the fuel vapor recovery system while the engine is not running;
    rotating the engine using an auxiliary power source to produce a partial vacuum in the recovery system and measuring a first fuel vapor pressure in the recovery system;
    closing the fuel vapor management valve; and,
    measuring a second fuel vapor pressure in the recovery system and determining a change in pressure in said fuel vapor recovery system when compared to said first fuel vapor pressure indicative of a breech of said fuel vapor recovery system integrity.

15. The method of claim 14 further comprising the steps, prior to said opening step, of:
    closing the vent valve; and
    closing the throttle valve to prevent air from being drawn into the engine.

16. The method of claim 14, wherein rotating the engine is performed by using one of an electric drive motor and an electrical generator as the auxiliary power source.

17. The method of 14, wherein the rotating step is continued until the pressure within the fuel vapor recovery system is reduced to a preselected pressure.

18. The method of claim 14, wherein the rotating step is continued for a preselected length of time.

19. The method of claim 14, wherein the method further comprises stopping rotation of the engine and the measuring step is performed after the rotating step has stopped.

20. A method of monitoring fuel vapor recovery system integrity in a fuel vapor recovery system of a vehicle having an internal combustion engine, said monitoring occurs while the engine is not running, comprising the steps of:
    closing the fuel vapor recovery system;
    opening a fuel vapor management valve providing fluid communication between the engine and the fuel vapor recovery system when the engine is not running;

rotating the engine to reduce the pressure in the fuel vapor recovery system;

closing the fuel vapor management valve and determining a first fuel vapor pressure in the fuel vapor recovery system; and measuring a second fuel vapor pressure in the recovery system and determining a change in pressure in said fuel vapor recovery system when compared to said first fuel vapor pressure indicative of a breech of said fuel vapor recovery system integrity.

21. The method of claim 20, wherein closing the fuel vapor recovery system comprises closing a valve connecting the fuel vapor recovery system with the atmosphere.

22. The method of claim 20, wherein closing the fuel vapor recovery system further comprises closing an engine throttle valve to prevent the flow of air into the engine.

23. The method of claim 20, wherein rotating the engine comprises driving the engine with an electric motor.

24. The method of claim 20, wherein rotating the engine comprises driving the engine with an electric generator.

25. The method of claim 20, wherein rotating the engine is performed for a preselected length of time.

26. The method of claim 20, wherein rotating the engine is performed until the pressure in the fuel vapor recovery system is reduced to a preselected level.

* * * * *